United States Patent [19]

Deisenroth et al.

[11] Patent Number: 5,150,781
[45] Date of Patent: Sep. 29, 1992

[54] MODULAR CONVEYOR SYSTEM

[75] Inventors: Harold G. Deisenroth; Jeffrey W. Drawe, both of Rochester, N.Y.

[73] Assignee: Xerox Corporation, Stamford, Conn.

[21] Appl. No.: 544,578

[22] Filed: Jun. 27, 1990

[51] Int. Cl.⁵ .............................. B65G 37/00
[52] U.S. Cl. .................. 198/349.8; 198/464.2
[58] Field of Search .............. 198/464.2, 349.8

[56] References Cited

U.S. PATENT DOCUMENTS

| | | | |
|---|---|---|---|
| 2,346,659 | 4/1944 | Bruce | 198/303 |
| 2,785,785 | 3/1957 | Macaluso | 198/464.2 X |
| 3,709,381 | 1/1973 | Sullivan et al. | 198/349.7 |
| 3,710,917 | 1/1973 | Black et al. | 198/464.2 X |
| 3,737,019 | 6/1973 | Coleman et al. | 198/464.2 |
| 4,015,706 | 4/1977 | Goffredo et al. | 198/780 |
| 4,227,607 | 10/1980 | Malavenda | 198/460 |
| 4,236,631 | 12/1980 | Bowen et al. | 198/583 |
| 4,239,439 | 12/1980 | Gannon | 198/349.8 |
| 4,453,627 | 6/1984 | Wilkins | 198/781 |
| 5,058,727 | 10/1991 | Jahns et al. | 198/575 |

Primary Examiner—Robert P. Olszewski
Assistant Examiner—Cheryl L. Gastineau

[57] ABSTRACT

A modular conveyor and conveyor system for transporting articles thereon. The functioning of the entire system is integrated by a programmable logic controller (PLC) mounted on each conveyor unit. Where PLCs on adjacently connected conveyors communicate with one another. Each conveyor has sensing devices for communicating with the PLC by indicating the absence or presence of articles located at specific zones on the conveyor. In response to the sensing input, the PLC will send and receive articles to and from adjoining units. All of the movement of articles on the conveyor system are preprogrammed into the PLC, however manual over-ride is provided for. The conveyors have rollers for moving articles along the length of the units. Belts are located at one end for moving articles transverse to the roller movement. Roller-ball racks are used for rotational movement of articles on the unit. The PLC controls the activation of the rollers, belts, and racks of the conveyor in response to the sensor input information.

12 Claims, 11 Drawing Sheets

MODULAR CONVEYOR SYSTEM

BACKGROUND OF THE INVENTION

1. Field of the Invention

The present invention relates generally to a conveyor system having a plurality of modular conveyors for transporting articles. Specifically, this invention relates to a singular modular conveyor designed to be connected to other modular conveyors to form a system for transporting articles. Individual programmable logic controllers (PLC) mounted on each conveyor communicate with one another to control the routing of articles through the system.

2. Description of the Prior Art

There are a wide variety of modular conveyor systems for transporting articles. For example, U.S. Pat. No. 2,346,659, a merchandise conveyor is disclosed where each section is individually powered and uses rollers to convey materials. A connector is provided to attach several units together. U.S. Pat. No. 3,709,381 discloses a cargo handling system and method; wherein, several different types of modules are disclosed which can be arranged in a variety of ways. A computer system is provided to control each section of the system. Each module is separately powered and can be configured to move a load in any direction. The computer allows for instant recall of the location of an article located anywhere within the system. Another example is U.S. Pat. No. 4,015,706, this invention was developed in order to provide a capacity for quickly and efficiently arranging and constructing an etching system, on a customized basis, by providing a desired etching capacity, a desired rinsing capacity, a desired drying capacity, etc., in the provision of modules, that may be combined in units, or in groups, to achieve a desired treatment. The modules are connected together, and are carefully aligned, and are commonly driven, with a way provided for readily connecting a drive of one module, to the drive of another. U.S. Pat. No. 4,227,607, which discloses a method and system for dynamically storing articles; wherein, baggage can be either stored or moved through the system. A central controller monitors all of the sensors of the entire system. Each unit within a chain is individually powered. Similarly, U.S. Pat. No. 4,236,631 discloses a conveyor unit that connects to other units, is individually powered and has sensing devices on each of the units. Although, it is disclosed that each conveyor has a control device, such a device is only a simple circuits relay, not a programmable logic controller. Another such conveyor system is disclosed in U.S. Pat. No. 4,453,627, where each unit is divided into a plurality of zones and sensors for those zones. Each unit is controlled by using hydraulic pressure in response to sensors in the zones.

Although these identified conveyor systems work well, they all lack an efficient and flexible communication means. Either, these systems are designed to be set up in one configuration and remain that way and are not made for disassembly and reassembly in an easy fashion, or a large central communications control system is needed to keep track of the various articles being transported along the conveyor system. These systems are either too complex, requiring long setup times and little flexibility, or are too simple, providing little flexibility in control of the conveyors.

Especially in todays international market place, corporations that can not bring a new product to the consumers in less time and at less cost will lose their markets. The successful corporations will be able to change their product lines quickly and inexpensively to reflect often quick consumer demand changes as well as new product innovations. Often a major road block to achieve these goals is the difficulty of setting up the manufacturing operations, often taking a great deal of time and expense. Specifically, the sophisticated modern assembly line conveyor system is difficult and expensive to set up.

Therefore, in response to this complexity of sophisticated and relatively inflexible conveyor systems, a need exists for a flexible modular conveyor system that is quick to set up, can be reconfigured quickly, and has the capability of flexibly controlling the conveyor operations through a simple programmable controlling logic system.

Therefore, the present invention provides a solution to the described problems and other problems, and also offers other advantages over the prior art.

SUMMARY OF THE INVENTION

The present invention comprises a modular flexible programmable logic control conveyor for moving articles along a preselected pathway. Specifically, a system for transporting articles, comprising a first conveyor unit including first means for sensing the presence of articles on the first conveyor unit. First means moves the articles positioned on the first conveyor unit. A first programmable logic controller mounted on the first conveyor unit in communication with the first sensing means, is adapted to regulate the first moving means.

Moreover, the article transporting system further comprises a second conveyor unit including a second means for sensing the presence of articles on the second conveyor unit. A second means for moving the articles positioned on the second conveyor unit. A second programmable logic controller mounted on the second conveyor unit in communication with the second sensing means and the first programmable controller is adapted to regulate the second moving means. The first programmable logic controller is responsive to the communication from the first sensing means and the second programmable logic controller, regulates the activation of the first moving means to move the articles on the first conveyor unit along a selectable programmed path.

BRIEF DESCRIPTION OF THE DRAWINGS

In the drawings, like reference numerals indicate corresponding parts of preferred embodiments of the present invention throughout the several views, in which.

DETAILED DESCRIPTION OF THE PREFERRED EMBODIMENTS

Although specific terms are used in the following description for the sake of clarity, these terms are intended to refer only to the particular structure of the invention selected for illustration in the drawings, and are not intended to define or limit the scope of the invention.

Figure 1:
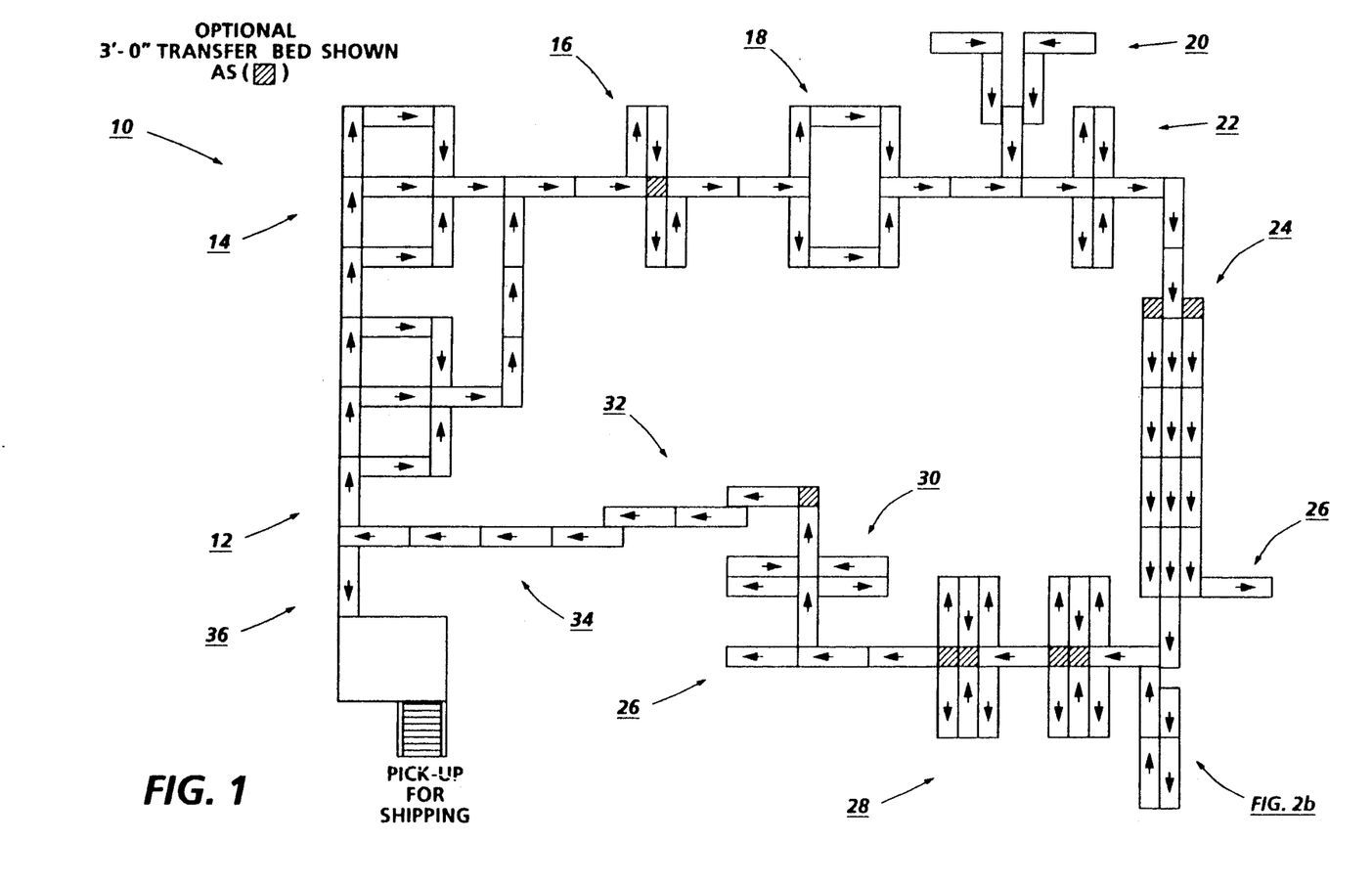
FIG. 1 is an elevational view of the conveyor system showing how articles can be routed thereon.

Referring now to the drawings, and to FIG. 1 in particular, the present invention provides a modular flexible programmable logic controller conveyor system 10 for conveying articles along a serpentine path, which can be reconfigured in a multitude of pathways. FIG. 1 illustrates possible configurations of the conveyor system. Conveyor system 10 starts out with a pallet return station 12 where pallets are first placed onto conveyor system 10. Next, the pallet will be conveyed to several sub-assembly stations 14 where the first stages of article manufacturing takes place. Depending on the model of article to be made, different sub-assembly 14 routs can be taken. A sequential operations or progressive loop 16 follows, where the article can go around the loop. The conveyor system 10 also provides for robotic cells 18 in the form of a double loop design, where articles can go in either direction around the robots in the center. Next, a joining sub-assembly 20 can follow, where more parts that need assembly are joined to the main article. A single model mix loop 22 follows, where the article can go to either side depending on the model type to be completed. Following, a larger section for parallel operation 24, where the conveyor assembly line 10 can be balanced out or separating out the different models. It is seen that there are several reject spurs 26 located along the end of the conveyor assembly line 10, where defective products can be removed from the main flow. Also, run and test quality control loops 28 can be configured by the conveyor system. Moreover, a rework loop 30, similar in design to the model mixing loops, can be designed from the conveyor system 10. An in-line offset section 32 can be configured also. Finally, a pre-packing stage 34, and a packaging stage 36 will wind up the conveyor system.

It should be noted that FIG. 1 represents possible designs and configurations for the conveyor system 10. There are an infinite number of configurations possible for any one conveyor system.

Figure 2A:
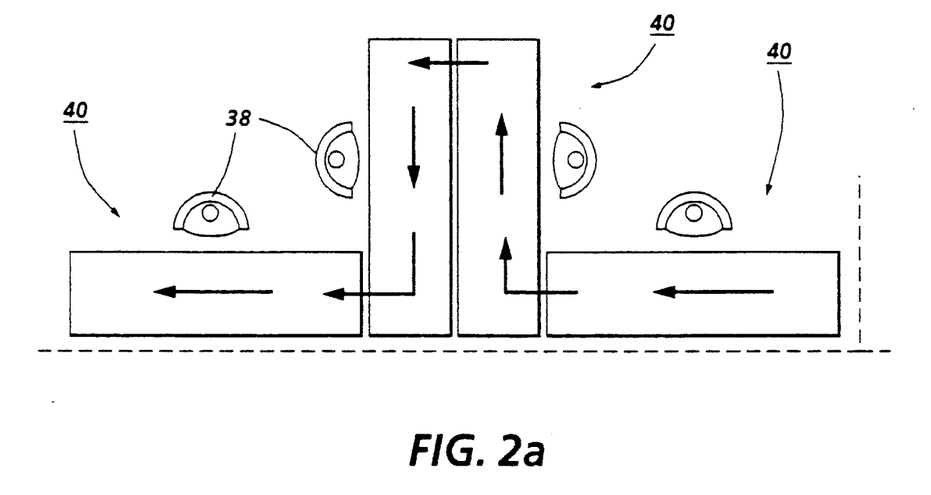
FIG. 2a is an enlarged elevational view depicting possible pathways to be used by the conveyor system.
Figure 2B:
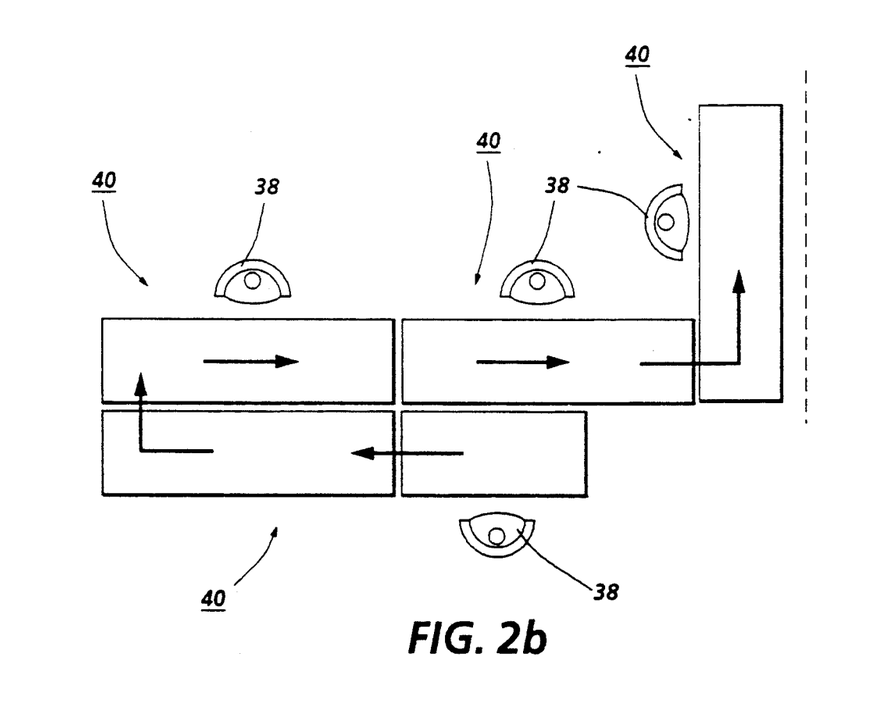
FIG. 2b is an enlarged elevational view showing possible pathways to be used by the conveyor system.

FIGS. 2a and 2b are enlarged views of possible conveyor designs. The assembly workers 38 are located around the conveyors. FIG. 2a shows a portion of a rework loop or a model mix loop. FIG. 2b shows a type of sub-assembly joinder, where some pre-assembly of the part is required before adding it to the main article being assembled.

It is noted here, that any single conveyor unit is capable of being positioned where any other conveyor unit is; this is one of the keys to the modular concept. Any one conveyor unit is capable of being programmed to move articles in a variety of paths and directions. This will be made clearer by turning to FIG. 3.

Figure 3:
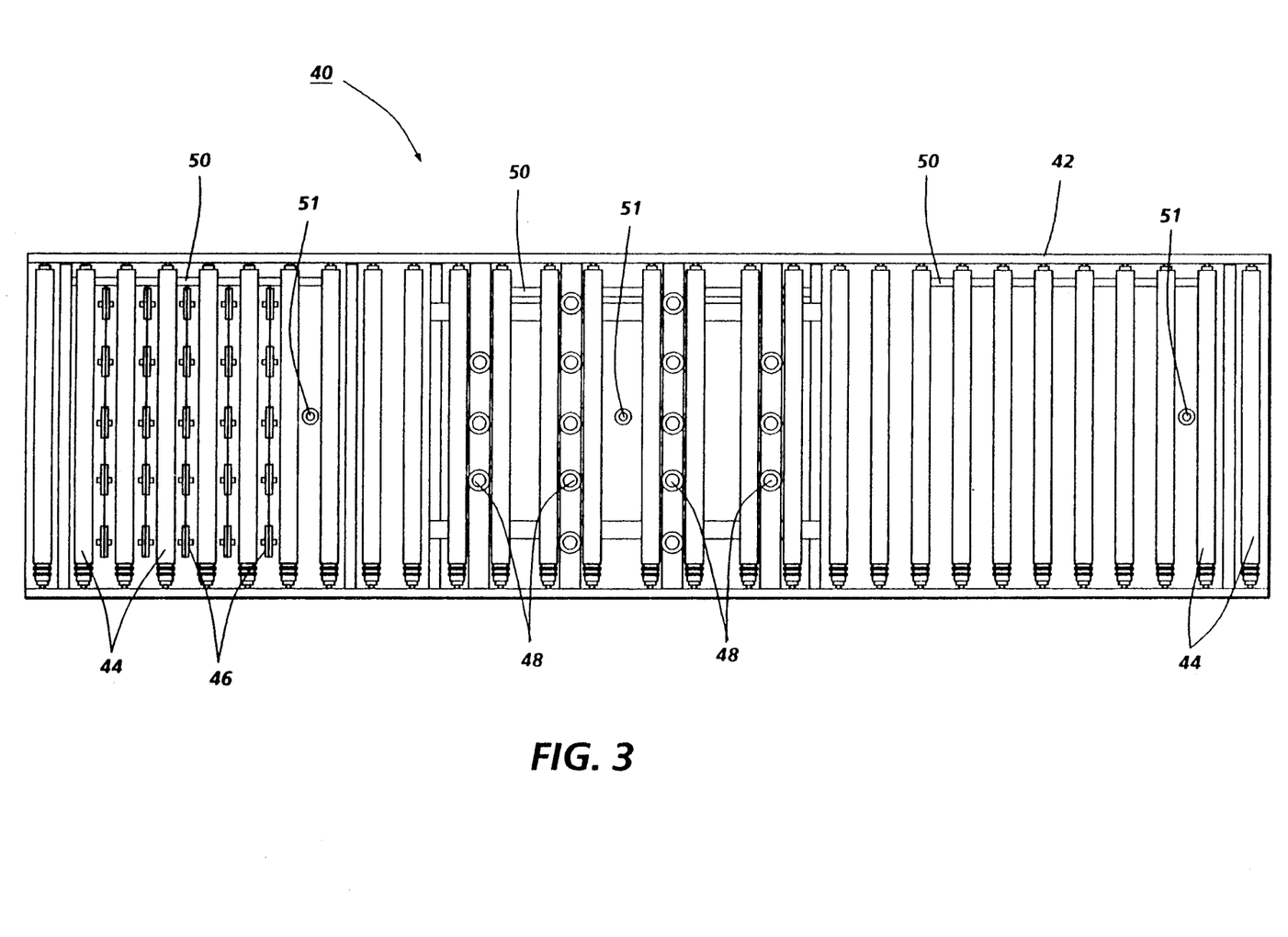
FIG. 3 is a plan view of a single conveyor unit.

In FIG. 3, a single conveyor unit 40 is shown. Two channels on either side form the main part of the conveyor bed 42. Attached to the bed 42 are the rollers 44, which carry articles down the length of the conveyor 40. Situated between the rollers 44 are the transfer belts 46, which transport articles in a direction perpendicular to the direction of the rollers 44. Specifically, the transfer belts 46 will take articles and move them off of or on to the rollers 44. The roller-balls 48 are situated between the rollers 44, and serve the function of allowing the article to be rotated around since the roller-balls 48 work like a ball point pen tip. Running the length of the conveyor 40 are three brakes 50. The three brakes roughly divide the conveyor 40 into three zones; a first zone, at one end of the conveyor 40, corresponds to the transfer belts 46 and rollers 44 location. A second zone, located in the middle portion of the conveyor 40, corresponds to the assembly work station, the roller-balls 48 and rollers 44 are located there. A third zone, located on an opposite end to zone one, has rollers 44. The brakes 50 may be made from a bar of metal that may be hydraulicly, or by use of air pressure, forced up against all the rollers 44 located in that zone; thus, stopping the motion of the rollers and the article riding thereon. By way of example, the rollers, belts, and drive mechanism (discussed later), can all be purchased from either Ermanco, Inc. from Spring Lake, Mich., models XR40, XP45 and XR50 or from the Rapistan Co., in Victor, N.Y.

Located in each of the three zones is a photosensor 51, positioned between rollers 44. In operation, the photosensor emits light, upon being covered by an article, light bounces off the article and is caught by the photosensor 51 whereby an electrical signal is generated. Thus, an article will be detected upon passings or resting over the photosensor. For example, a commerically available model can be purchased from Telemecanique Inc., West Minster, Md. model #XUBH 083235.

Figure 4:
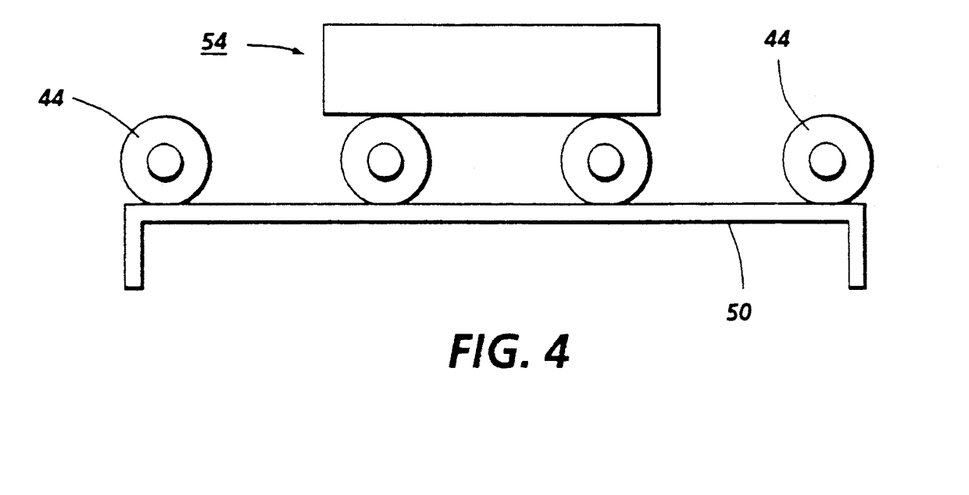
FIG. 4 is a schematic elevational view of the braking device during inactivation.
Figure 5:
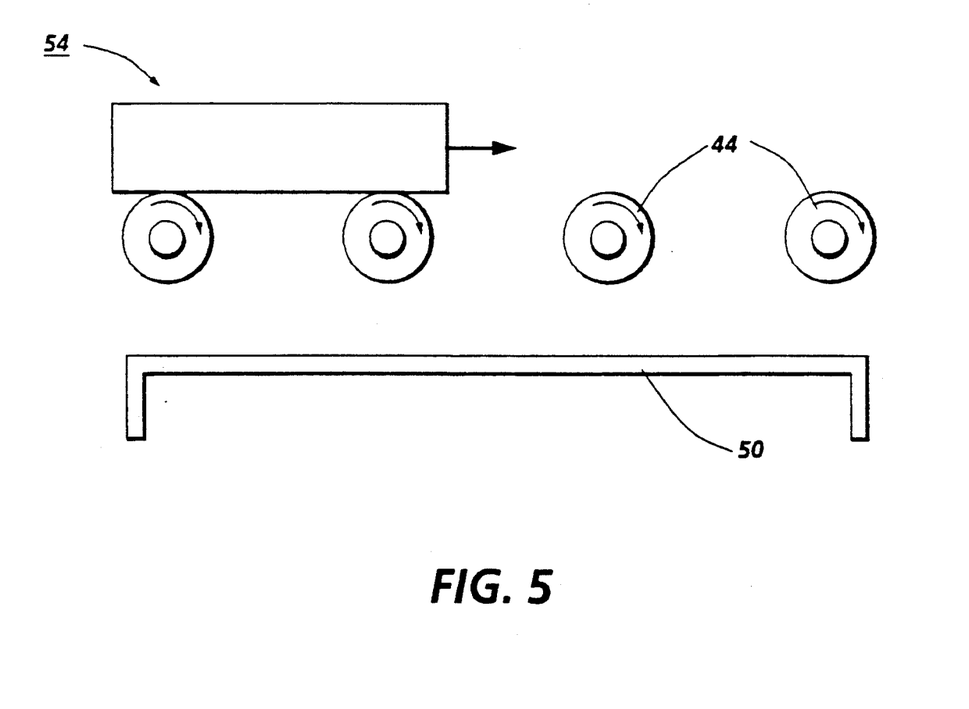
FIG. 5 is a schematic elevational view of the braking device during activation.

In FIGS. 4, and 5, an illustration of the brake 50 design is shown. In operation, an article 54 will be transported along the conveyor. Once the brake 50 is actuated the rollers 44 will stop rotating and the article 54 will stop progressing down the conveyor 40.

Figure 6A:
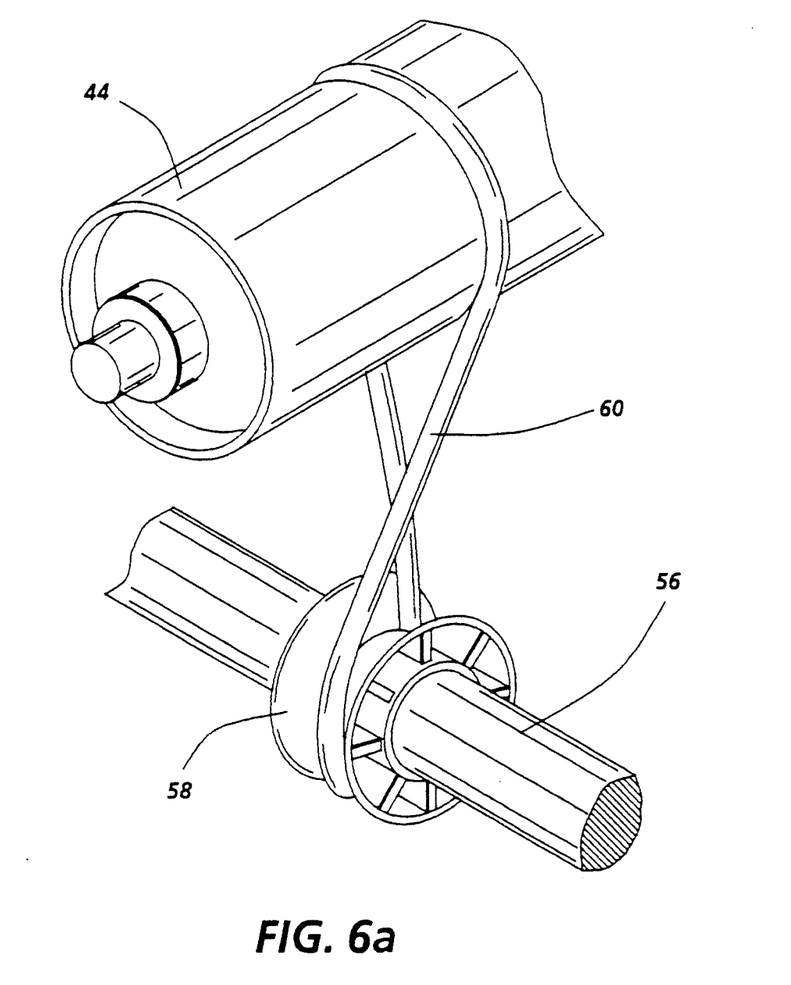
FIG. 6a is a perspective view of the roller drive mechanism.
Figure 6B:
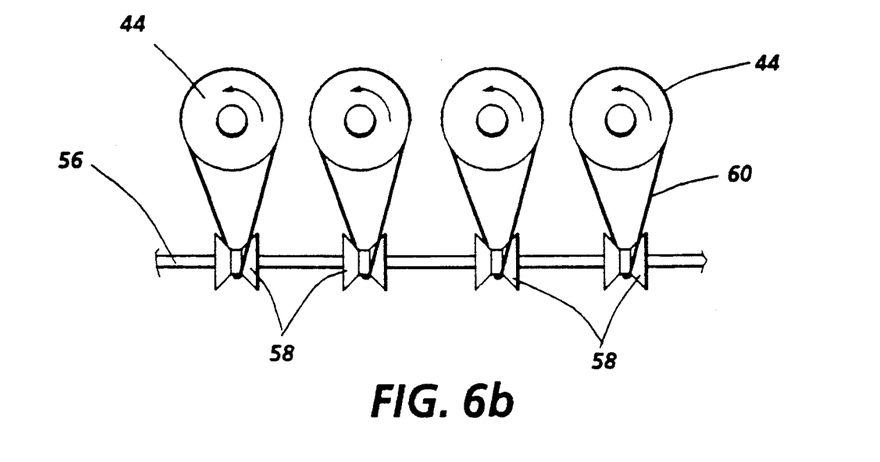
FIG. 6b is a side elevational view of the roller drive mechanism.

In FIGS. 6a and 6b, an illustration of the drive mechanism for the rollers is provided. Rollers 44 are rotated by being connected to a single drive shaft 56. A spool 58 is loosely and slidably mounted onto the drive 56. An elastic band 60 connects the roller 44 to spool 58. In operation, band 60 exerts a force onto the spool-shaft contact surfaces, thus providing friction for shaft 56 to turn spool 58 which in turn drives band 60 to rotate roller 44. Moreover, since spool 58 is loosely mounted on drive 56, a relatively strong force opposed to the direction of roller 44 will cause spool 58 to slip relative to shaft 56. Therefore, the brake 50 will provide the needed force to counter the drive force from shaft 56, thus shaft 56 will continue to rotate with spool 58 slipping thereon. This drive system allows for separating of the conveyor 40 into selected zones so that articles located on the conveyor 40 in one zone may be moved, while other articles located in a different zone on the conveyor may be stationary.

Figure 7A:
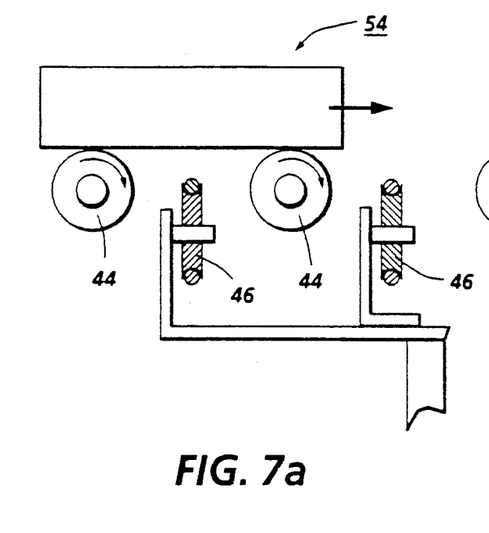
FIG. 7a is a side elevational view showing the vertical displacement of the belt drive device between the rollers.
Figure 7B:
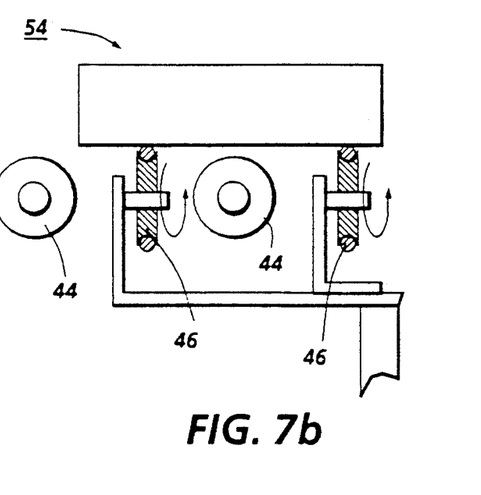
FIG. 7b is a side elevational view showing the vertical displacement of the belt drive device between the rollers
Figure 7C:
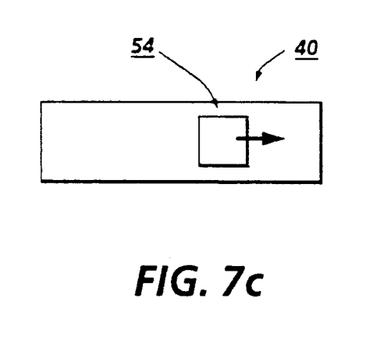
FIG. 7c is a fragmentary plan view showing an article moving on the conveyor.
Figure 7D:
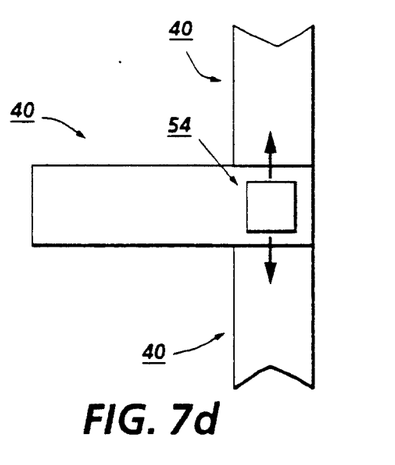
FIG. 7d is a fragmentary plan view showing an article moving on the conveyor.

FIGS. 7a through 7d illustrate how an article is transferred by the transfer belt 46 FIGS. 7a and 7c show that an article 54 is moved along the conveyor 40 on top of the rollers 44. Next, the brakes 50 are applied to the rollers 44 to stop the article 54 thereon. Then, as seen in FIGS. 7b and 7d, transfer belts 46 are activated and thereby raise the article 54 above the rollers; thus, belt 46 is activated to move vertically above the rollers so that the article 54 is spaced from the rollers and transferred to an adjoining conveyor 40.

Figure 8A:
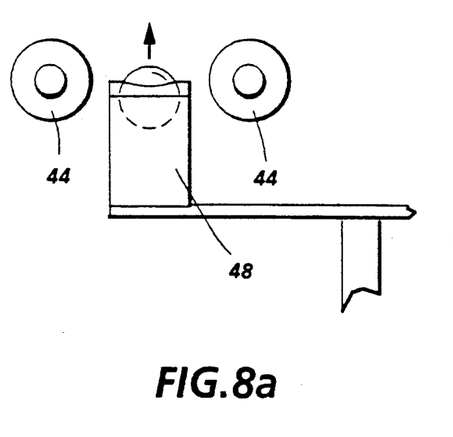
FIG. 8a is a side elevational view showing the vertical displacement of the roller-ball device between the rollers.
Figure 8B:
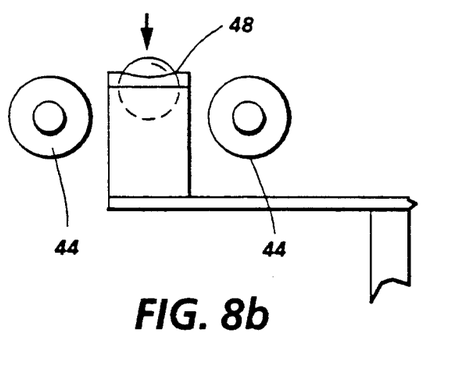
FIG. 8b is a side elevational view showing the vertical displacement of the roller-ball device between the rollers.

FIGS. 8a and 8b illustrate that the roller-ball 48 works in the same fashion as the transfer belt 46 in relation to the rollers 44.

Figure 9:
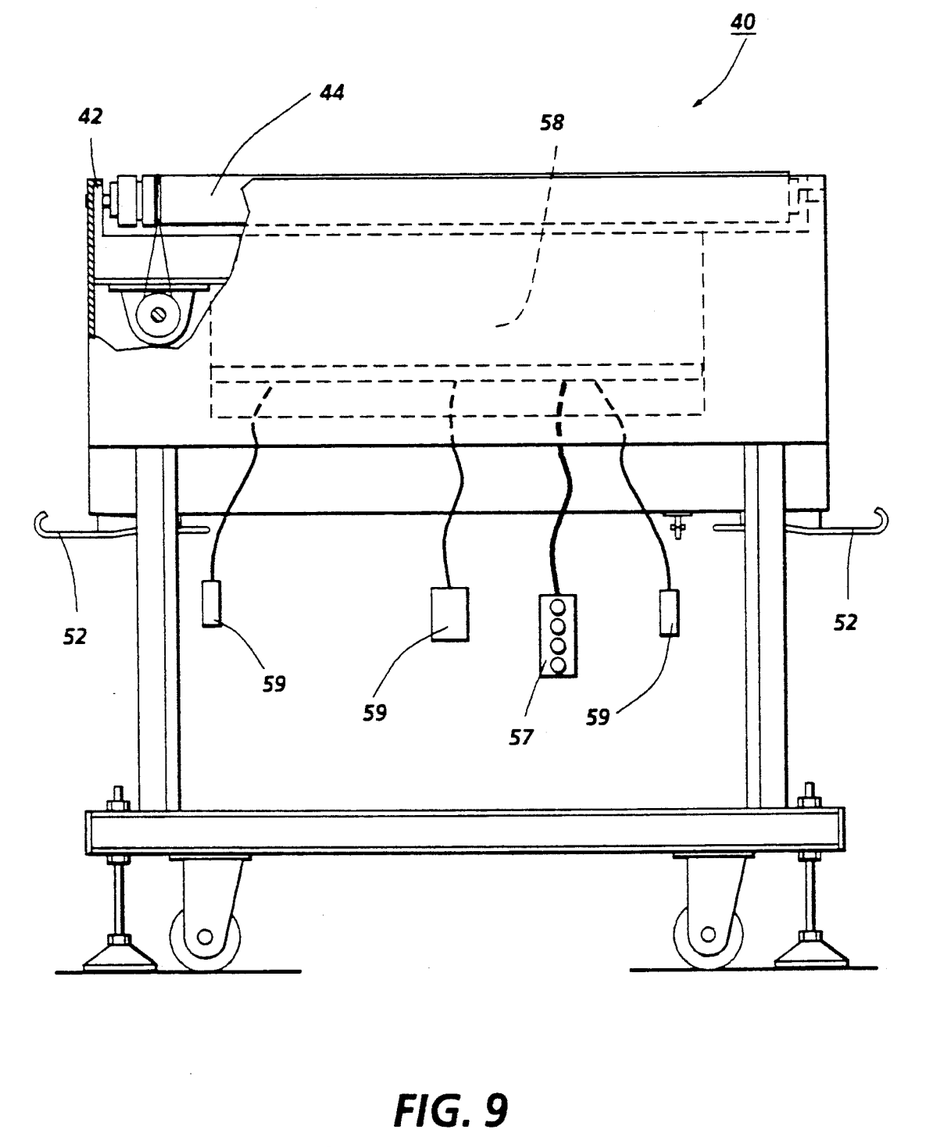
FIG. 9 is an end elevational view of the conveyor, programmable logic controller, and structural support design.

FIG. 9 is an end elevational view of the conveyor, programmable logic controller, and structural support design. As shown in the drawing, roller 44 is supported by bed 42 and driven by roller drive shaft 56. A programmable logic controller (PLC) 58 is housed within bed 42. A PLC hookup connector cable 59 connects adjacently positioned conveyors, thus allowing the PLCs to communicate with one another (discussed later). A conveyor hook connector 52 is mounted to the bed 42 to connect adjoining conveyor units 40 together. An operator control box 57 is connected to the PLC and provides for an operator override capability. For example, though the routing of articles are preprogrammed, the operator can interrupt the normal flow and redirect an article to another location or zone, whereupon, having completed the operator override, the preprogramming will then take over where it had left off. This operator override also includes an emergency shut-off button to shut down the conveyor operation for safety considerations. The operator override capability, in operation, performs the complex sequence of events in the same way as the PLC does, except that it is operator initiated and not PLC initiated (the functioning of the PLC is discussed later).

Figure 10:
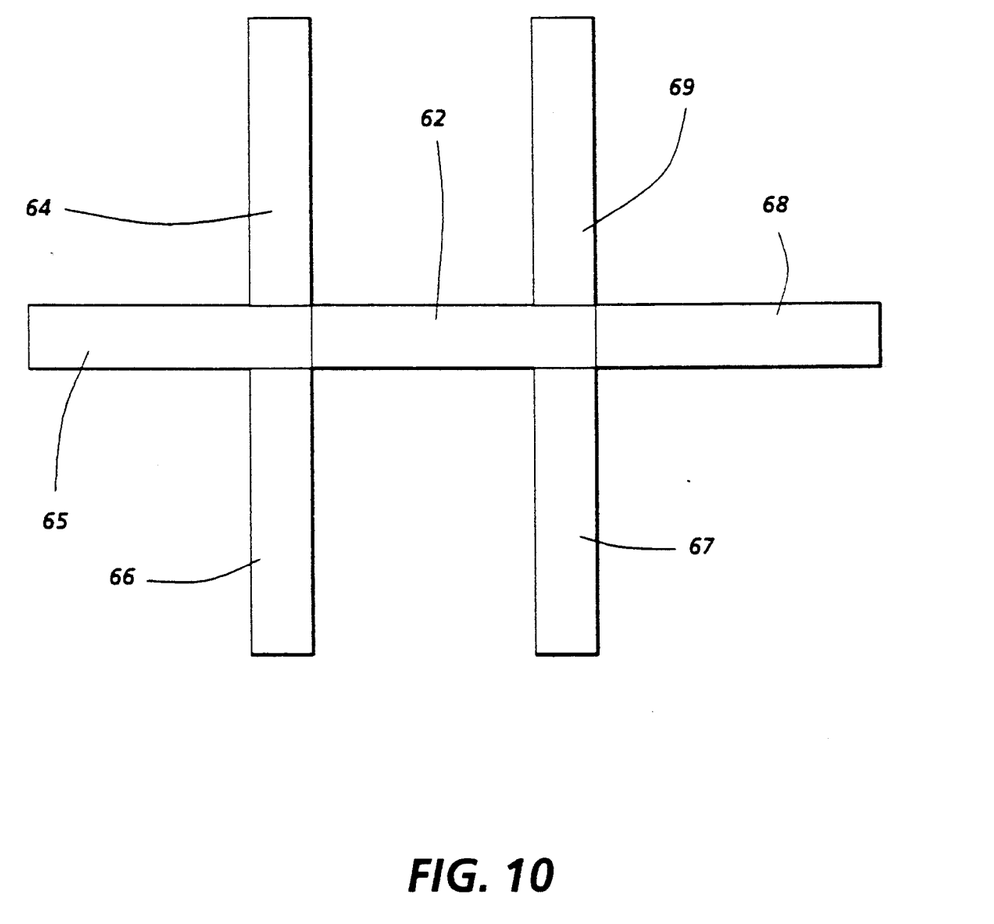
FIG. 10 is a plan view illustrating possible connections that can be made to one conveyor from adjoining conveyors.

FIG. 10 shows possible connections to one conveyor. As illusrated, three conveyors 64, 65, and 66 are in position to send articles to the main conveyor 62. Likewise, three conveyors 67, 68, and 69 are in position to receive articles from the main conveyor 62.

Figure 11A:
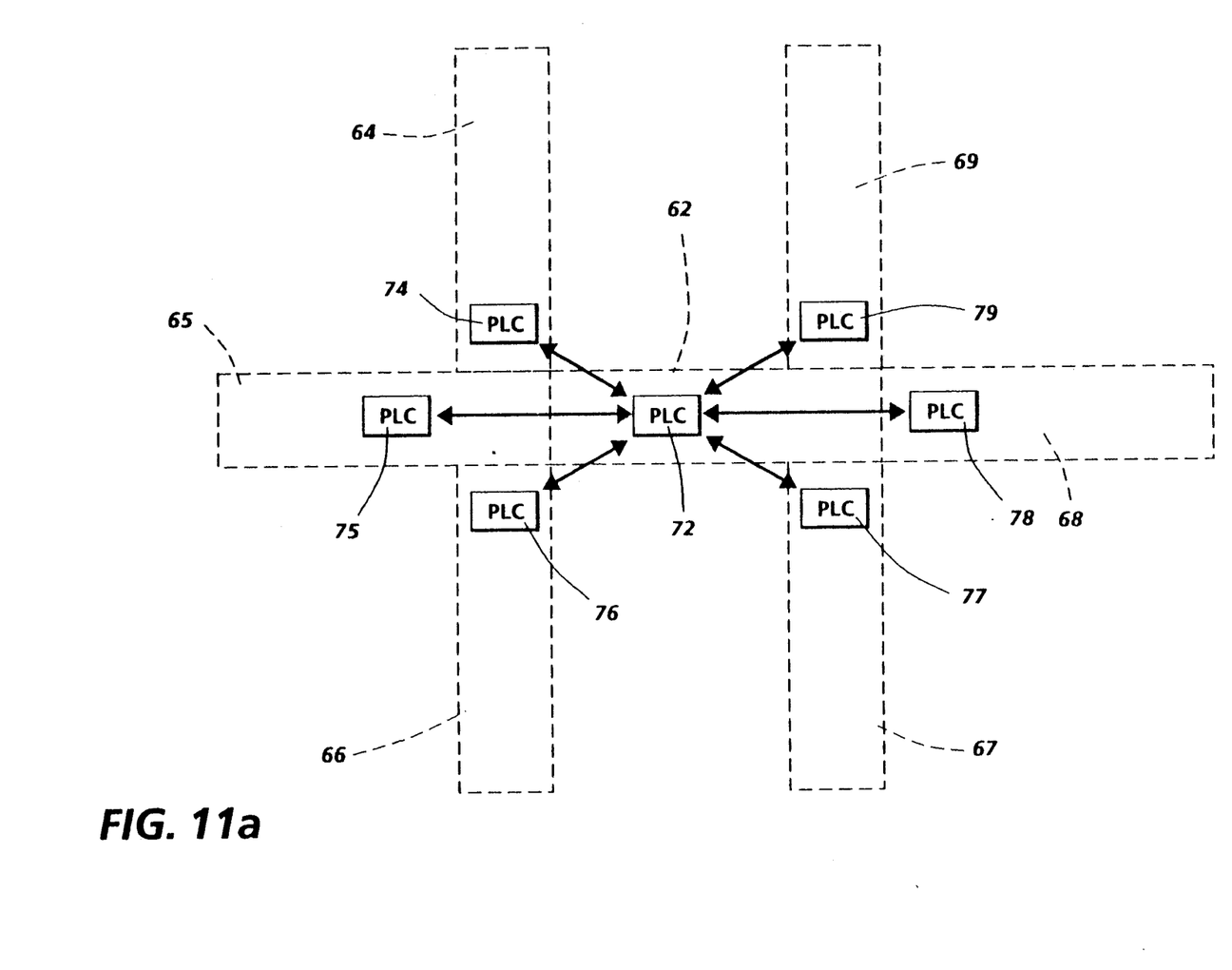
FIG. 11a is a block diagram illustrating the communication paths between the PLCs in the conveyors in FIG. 10.

FIG. 11a is a block diagram illustrating the communication paths between the PLCs 72-79 in the conveyors 62-69. There is a two way exchange of information between the main PLC 72 and the adjoining PLCs 74-79. Each PLC receives and sends information. There exists controls to move articles by programmed pathways without having a large central computer control. It should also be noted again that if one of the conveyors should malfunction another conveyor can immediately be positioned in its place and the PLC would be reprogrammed to do the pathway routings of the replaced unit. Thus increasing the flexibility of the conveyor system. A commercially available PLC can be purchased from Telemecanique Inc., of West Minster, MD, model no. TSX1723428.

Figure 11B:
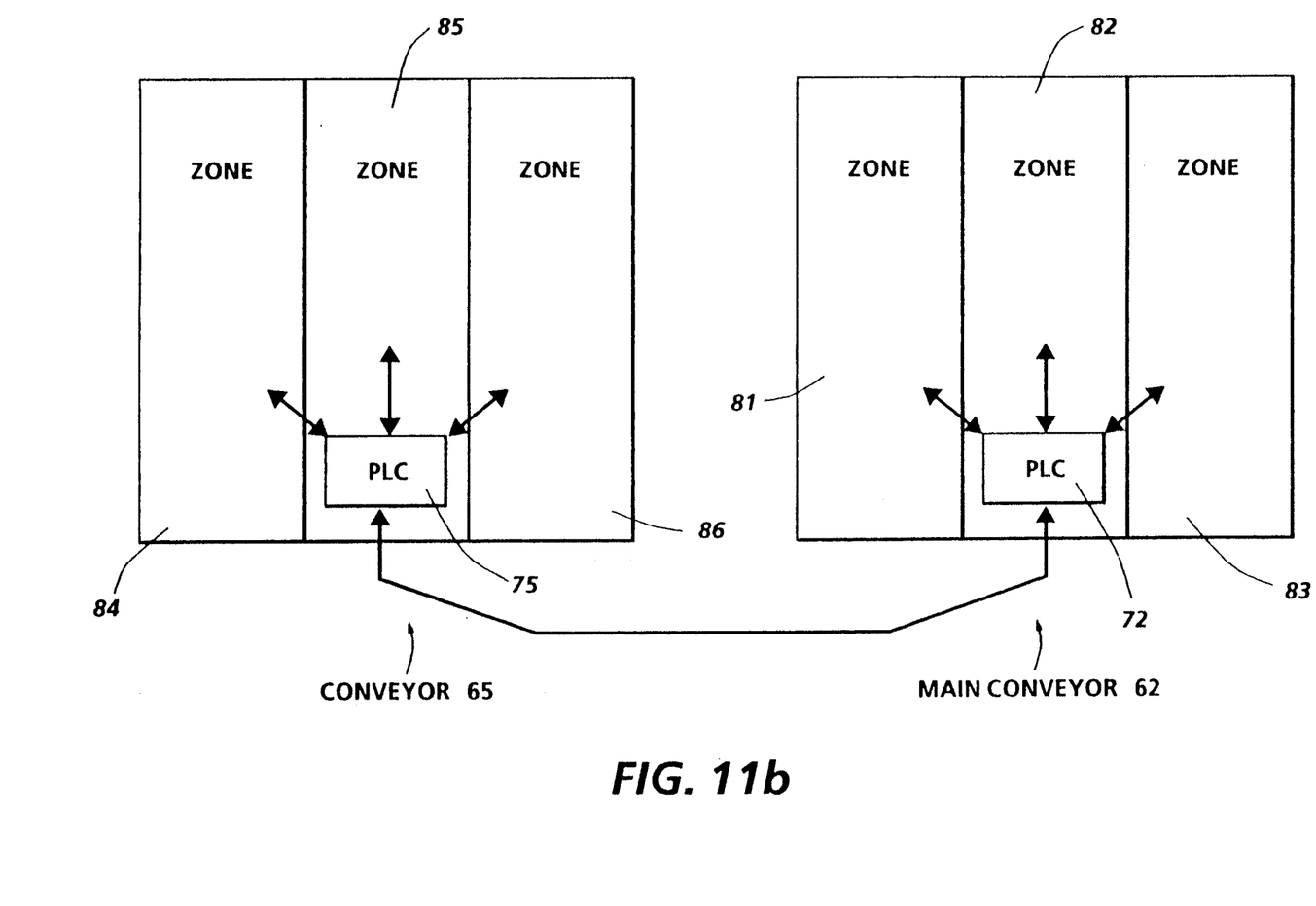
FIG. 11b is block diagram showing the PLC communication between the zones located on each conveyor and between the two conveyors.

FIG. 11b is a block diagram showing the PLC communication between the zones and between conveyors 62 and 65. Each standard size conveyor is divided up into three zones. A first and third zone encompassing the area and equipment used for receiving and/or transporting articles to and from other conveyors. A sensor, brake and rollers are located in the first zone, and a sensor, brake, transfer belts and rollers are located in the third zone. The second zone, encompassing the assembly work station, has a sensor, brake, roller-balls and rollers. As shown, conveyor 62, has PLC 72, zone 81, zone 82, and zone 83; while conveyor 65 has PLC 75, zone 84, zone 85, and zone 86. As illustrated, all communication between zones is controlled by a PLC. For example, the PLC 72 will first check if an article is in zone 81 and zone 82, if there is an article in zone 81 and zone 82 is empty, then the PLC will allow the article to move into zone 82. A more complete example will follow after a description of FIG. 11c.

Figure 11C:
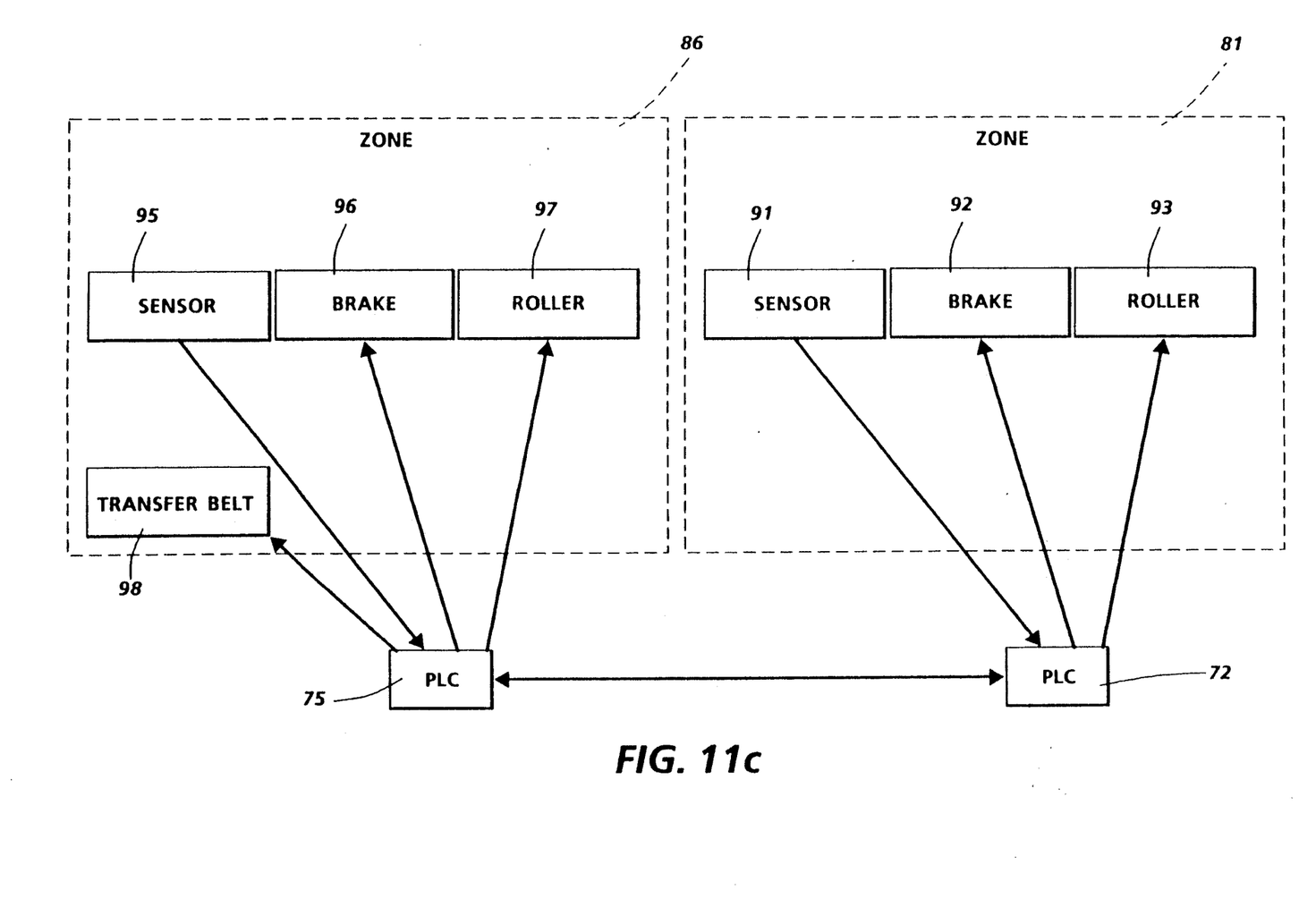
FIG. 11c is a block diagram showing the PLC communication between a single zone located on one conveyor and a second zone on another conveyor.

FIG. 11c is a block diagram showing the communication between two PLCs and their respective component parts in one of their zones. For the sake of simplicity, only the operation between two conveyors will be discussed; however, it is understood that the same operation takes place between all of the adjoining conveyors through the use of the respective PLCs mounted on each conveyor. Moreover, the same operations take place between zones on the same conveyor except that the same PLC is the controller for the two zones.

In operation, PLC 75 receives an electrical signal from sensor 95 when an article is located in zone three 86. Brake 96 is activated by PLC 75 to hold the article in the zone 86. Immediately, PLC 75 interrogates PLC 72 to verify if the article can be transferred to zone 81. If the signal received by PLC 72 from sensor 91 indicates the presence of an article in zone 81, then PLC 72 transmits a signal to PLC 75, where PLC 75 will inhibit movement of an article to zone 81. Alternatively, the signal received by PLC 72 from the sensor indicates the absence of an article in zone 81, PLC 72 transmits a signal to PLC 75 indicating that PLC 75 can have an article moved to zone 81. PLC 75 then releases brakes 96 and rollers 97 are activated to transfer the article to zone 81. Simultaneously, PLC 72 has rollers 93 in continuous activation and the article is rolled over into zone 81. Now PLC 75 no longer controls the moved article. However, PLC 72 will process information to determine if the article can move onto the next zone or if the article should be held on zone 81. It should be noted, in the above example the conveyors were end-to-end, if one of the conveyors were directed to the side of the other, like conveyor 64 to 65, the transfer belts 98, on conveyor 65, would have been used before using rollers 97.

By using this invention, increases in productivity may be expected because of efficient work flow routing, and because of the discipline forced on the production process by the system. Less material handling and operator movement should also increase productivity. Direct labor savings are appreciated because of the elimination of manual material handling. Less product damage can also be expected due to the reduction in material handling. With automated delivery, storage, and shipping, the potential for stock shrinkage is also greatly reduced.

Expansion is accomplished by adding conveyor modules to an existing system. Since each module bolts to the next in the same way, few constraints exist in such an expansion. Upgrading to a system using a combination of closed loops and progressive flow stations is done in the same way as simple expansion, just hook up more conveyors and program them one at a time.

The conveyor components are designed around a modular concept to allow maximum versatility in design and applications. The conveyor beds all attach in the same way. The control means all connect in the same way and only communicate with adjacent conveyors. thus each conveyor is programmed independent of a typical system communications. Each conveyor is able to be hooked up in any direction since the conveyor power means will run in either direction.

It is to be understood, however, that even though numerous characteristics and advantages of the present invention have been set forth in the foregoing description, together with details of the structure and function of the invention, the disclosure is illustrative, and changes in matters of order, shape, size, and arrangement of parts may be made within the principles of the invention and to the full extent indicated by the broad general meaning of the terms in which the appended claims are expressed.

The invention claimed is:

1. A system for transporting articles, comprising:
   a first conveyor unit including first means for sensing the presence of articles on the first conveyor unit, first means for moving the articles positioned on the first conveyor unit, a first programmable controller mounted on the first conveyor unit in communication with the first sensing means and adapted to regulate the first moving means; and
   at least a second conveyor unit attached to the first conveyor unit for receiving articles therefrom and for transporting articles thereto including a second means for sensing the presence of articles on the second conveyor unit, second means for moving the articles positioned on the second conveyor unit, a second programmable controller mounted on the second conveyor unit in communication with the second sensing means and coupled to the first programmable controller for communication therewith, and adapted to regulate the second moving means, the first programmable controller being responsive to communication from the first sensing means and the second controller for regulating the activation of the first moving means to move the articles along a programmable path.

2. The apparatus of claim 1, wherein:
   the first sensing means comprises a first light source, and a first photosensor responsive to the light source for generating electrical signals, the first photosensor transmitting the electrical signals to the first controller; and
   the second sensing means comprises a second light source, and a second photosensor responsive to the light source for generating electrical signals, the second photosensor transmitting the electrical signals to the second controller.

3. A system for transporting articles, comprising:
   a first conveyor unit, including
      first means for sensing the presence of articles on the first conveyor unit having a first light source and a first photosensor responsive to the first light source for generating first electrical signals,
      first means for moving the articles positioned on the first conveyor unit, including
         a first conveying means for conveying articles along a path running a length of the unit.
         a first transverse movement means for movement of articles in a direction transverse to the movement of the articles upon the path of the first conveying means, and
         a first operator enabling means for enabling an operator to position an article independent of the conveying means and the transverse means to work on the article;
      a first programmable controller mounted on the first conveyor unit in communication with the first sensing means, wherein the first photosensor transmits the first electrical signals to the first controller and the first controller is adapted to regulate the first conveying means, the first transverse movement means and the first operator enabling means of the first moving means; and
   at least a second conveyor unit attached to the first conveyor unit for receiving articles therefrom and for transporting articles thereto, including
      second means for sensing the presence of articles on the second conveyor unit having a second light source and a second photosensor responsive to the second light source for generating second electrical signals,
      second means for moving the articles positioned on the second conveyor unit, including
         a second conveying means for conveying articles along a path running a length of the unit,
         a second transverse movement means for movement of articles in a direction transverse to the movement of the articles upon the path of the second conveying means, and
         a second operator enabling means for enabling an operator to position an article independent of the conveying means to work on the article;
      a second programmable controller mounted on the second conveyor unit in communication with the second sensing means and coupled to the first programmable controller for communication therewith, wherein the second photosensor transmits the second electrical signals to the second controller and the second controller is adapted to regulate the second conveying means, the second transverse moving means, and the second operator enabling means of the second moving means, the second controller being further adapted to communicate with the first programmable controller such that the first programmable controller being responsive to the first sensing means and the second controller for regulating the activation of the first moving means to move the articles on the first conveyor unit along a programmable path.

4. The apparatus of claim 3, wherein the operator programmable controller comprises means for manually overriding the controller.

5. A conveyor including a plurality of conveyor units attached to one another for transporting articles there-between, each of said plurality of conveyor units, comprising:
   means for moving articles along a preselected path;
   means, operatively associated with the moving means, for sensing the presence of articles upon the moving means; and
   individually programmable control means, responsive to the sensing means and operatively associated with a respective conveyor unit, for programmably controlling the moving means to route articles along a preselected path.

6. The conveyor of claim 5, wherein each conveyor unit further comprises:
   means, connected to the moving means and mounted on the conveyor unit for driving the moving means; and
   a conveyor bed having the moving means, the sensing means, the controlling means, and the driving means mounted therein.

7. The conveyor of claim 5, wherein the moving means comprises:
   conveying means, responsive to the controlling means mounted on the bed, for conveying articles in a linear path along the bed;
   transverse movement means, responsive to the controlling means, mounted on the bed for movement of articles in a direction transverse to the linear path of the conveying means; and
   an operator enabling means, for positioning an article independent of the conveying means and the transverse means at a selected location to enable the operator to work on the article.

8. The conveyor of claim 7, wherein the conveying means comprises:
   a plurality of parallel rollers having their longitudinal axes substantially perpendicular to the linear path and connected to the conveyor bed; and
   roller rotating means, connected to the bed responsive to the controlling means, for rotating the rollers in unison and in the same direction to be able to move an article supported by the rollers along the linear path.

9. A conveyor for transporting articles, each said conveyor unit comprising:
   means for moving articles along a preselected path;
   means, operatively associated with the moving means, for sensing the presence of articles upon the moving means;
   means, responsive to the sensing means for programmably controlling the moving means to route articles along a preselected path;
   means, connected to the moving means and mounted on the conveyor, for driving the moving means; and
   a conveyor bed having the moving means, the sensing means, the controlling means and the driving means mounted therein;
   the moving means including
      conveying means, responsive to the controlling means and mounted on the bed, for conveying articles in linear path along the bed, wherein the conveying means includes a plurality of parallel rollers having their longitudinal axes substantially perpendicular to the linear path and connected to the conveyor bed, and roller rotating means, responsive to the controlling means and connected to the bed, for rotating the rollers in unison and in the same direction to move an article supported by the rollers along the linear path,
      transverse movement means, responsive to the controlling means and mounted on the bed for movement of articles in a direction transverse to the linear path of the conveying means, and
      an operator enabling means, for positioning an article independent of the conveying mans and the transverse means at a selected location to enable the operator to work on the article, wherein the operator enabling means includes a plurality of roller ball backs, connected to the bed, positioned between the rollers, and having a deactivated position where the roller-balls are located below the plurality of rollers enabling the article to be moved upon the rollers, and an activated position where the roller-balls are located above the plurality of rollers where the article is supported on the roller-balls so that the operator can position the article at the selected location enabling the operator to work on the articles, and roller-ball moving means, responsive to the operator enabling means, for moving the roller-balls from the deactivated position to the activated position.

10. The conveyor of claim 9, wherein the transverse movement means comprises:
   a plurality of belt transfer tracks, connected to the bed, positioned between the rollers and having a deactivated position where the tracks are located below the plurality of rollers and enabling the article to be moved by the rollers, and an activated position where the tracks are located above the plurality of rollers allowing the article to be supported on the belts enabling the article to be transferred transversely; and
   track moving means, connecting the tracks responsive to the controlling means, for moving the tracks from the deactivated position to the activated position.

11. The conveyor of claim 10, wherein the sensing means comprises:
   at least one light source, mounted to the bed, between adjacent rollers; and
   at least one photosensor, responsive to the light source for generating electrical signals, the photosensor transmitting the electrical signals to the controller indicating the presence or absence of an article.

12. The conveyor of claim 11, further including means for manually overriding of the control means.

* * * * *